United States Patent
Yang et al.

(10) Patent No.: US 9,577,263 B2
(45) Date of Patent: Feb. 21, 2017

(54) ANODE ACTIVE MATERIAL-CONTAINING SLURRY, ANODE USING THE SLURRY AND ELECTROCHEMICAL DEVICE COMPRISING THE ANODE

(71) Applicant: LG Chem, Ltd., Seoul (KR)

(72) Inventors: Ji-Hye Yang, Daejeon (KR); Jang-Bae Kim, Daejeon (KR); Byoung-Bae Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/518,195

(22) Filed: Oct. 20, 2014

(65) Prior Publication Data

US 2015/0037672 A1   Feb. 5, 2015

Related U.S. Application Data

(63) Continuation of application No. PCT/KR2014/002603, filed on Mar. 27, 2014.

(30) Foreign Application Priority Data

Mar. 27, 2013   (KR) .......................... 10-2013-0032930

(51) Int. Cl.
*H01M 4/62* (2006.01)
*H01M 10/052* (2010.01)
(Continued)

(52) U.S. Cl.
CPC ........... *H01M 4/622* (2013.01); *H01M 10/052* (2013.01); *H01M 4/0404* (2013.01);
(Continued)

(58) Field of Classification Search
None
See application file for complete search history.

(56) References Cited

U.S. PATENT DOCUMENTS 5,708,349 A * 1/1998 Hasebe ................. H01M 4/242
                                               29/623.5
2005/0158624 A1   7/2005 Park et al.
(Continued)

FOREIGN PATENT DOCUMENTS

CN   102522524 A   6/2012
JP   2011171181 A  9/2011
(Continued)

OTHER PUBLICATIONS

Chong et al., "A comparative study of polyacrylic acid . . . " Journal of Power Sources 196 (2011) 7707-7714.*
(Continued)

*Primary Examiner* — Alix Eggerding
(74) *Attorney, Agent, or Firm* — Lerner, David, Littenberg, Krumholz & Mentlik, LLP

(57) ABSTRACT

The present disclosure relates to an anode active material-containing slurry, an anode using the slurry, and an electrochemical device comprising the anode. More specifically, the present disclosure relates to a slurry comprising an anode active material; a polymer binder comprising styrene butadiene rubber and potassium polyacrylate; a conductive material; and a dispersing medium, an anode using the slurry, and an electrochemical device comprising the anode. The anode active material-containing slurry according to one aspect of the present disclosure can relieve the volume expansion of an anode active material by the intercalation and disintercalation of lithium during cycles of electrochemical devices to improve the durability of an anode active material layer, thereby enhancing the life characteristics of the electrochemical devices, and can form an anode active material layer having a high peeling force even though potassium polyacrylate with a relatively lower weight-average molecular weight is used.

14 Claims, 1 Drawing Sheet

(51) Int. Cl.

| | | |
|---|---|---|
| H01M 4/02 | (2006.01) | |
| H01M 4/04 | (2006.01) | |
| H01M 4/131 | (2010.01) | |
| H01M 4/134 | (2010.01) | |
| H01M 4/1391 | (2010.01) | |
| H01M 4/1395 | (2010.01) | |

(52) U.S. Cl.
CPC .......... *H01M 4/0471* (2013.01); *H01M 4/131* (2013.01); *H01M 4/134* (2013.01); *H01M 4/1391* (2013.01); *H01M 4/1395* (2013.01); *H01M 2004/027* (2013.01)

(56) References Cited

U.S. PATENT DOCUMENTS

| | | | | |
|---|---|---|---|---|
| 2007/0026313 | A1* | 2/2007 | Sano | H01M 4/134 |
| | | | | 429/217 |
| 2007/0092796 | A1* | 4/2007 | Matsuda | H01M 4/38 |
| | | | | 429/217 |
| 2008/0176133 | A1 | 7/2008 | Hirose et al. | |
| 2012/0115033 | A1* | 5/2012 | Kim | C01B 31/00 |
| | | | | 429/231.8 |
| 2012/0326500 | A1* | 12/2012 | Hirose | H01M 4/485 |
| | | | | 307/9.1 |
| 2013/0112928 | A1 | 5/2013 | Omote et al. | |

FOREIGN PATENT DOCUMENTS

| | | |
|---|---|---|
| JP | 2011243345 A | 12/2011 |
| JP | 2012-142311 A | 7/2012 |
| KR | 2005-0075635 A | 7/2005 |
| KR | 2007-0099443 A | 10/2007 |
| KR | 20080034218 | 4/2008 |
| KR | 2013-0003884 A | 1/2013 |

OTHER PUBLICATIONS

International Search Report from PCT/KR2014/002603 dated Jul. 4, 2014.

Zhu, Xiaoming et al., Preparation and electrochemical characterization of the alkaline polymer gel electrolyte polymerized from acrylic acid and KOH solution, Electrochimica Acta., 2004, vol. 49, pp. 2533-2539.

Chong, et al., "A comparative study of polyacrylic acid and poly(vinylidene difluoride) binders for spherical natural graphite/LiFePO4 electrodes and cells." Journal of Power Sources, vol. 196, Apr. 23, 2011, pp. 7707-7714.

* cited by examiner

ANODE ACTIVE MATERIAL-CONTAINING SLURRY, ANODE USING THE SLURRY AND ELECTROCHEMICAL DEVICE COMPRISING THE ANODE

CROSS-REFERENCE TO RELATED APPLICATION(S)

This application is a continuation of International Application No. PCT/KR2014/002603 filed on Mar. 27, 2014, which claims priority under 35 USC 119(a) to Korean Patent Application No. 10-2013-0032930 filed on Mar. 27, 2013 in the Republic of Korea, which are incorporated herein by reference.

TECHNICAL FIELD

The present disclosure relates to an anode active material-containing slurry, more specifically an anode active material-containing slurry which can relieve the volume expansion of an anode active material by the intercalation and disintercalation of lithium, can improve the durability of an anode to enhance the life characteristics of an electrochemical device, and can form an anode active material layer having a high peeling force; an anode using the slurry; and an electrochemical device comprising the anode.

BACKGROUND ART

Recently, there has been an increasing interest in energy storage technology. Electrochemical devices have been widely used as energy sources in the fields of cellular phones, camcorders, notebook computers, PCs and electric cars, resulting in intensive research and development into them.

In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy. Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni—MH, Ni—Cd, and $H_2SO_4$—Pb batteries.

Such an electrochemical device generally comprises a cathode, an anode, and a separator interposed between the cathode and the anode. Each of the cathode and the anode comprises a current collector and an electrode active material layer formed by coating a slurry that contains an electrode active material, a polymer binder and a dispersing medium on the surface of the current collector, followed by drying.

Among electrode active materials, an anode active material may undergo volume expansion in the procedure that lithium is intercalated or disintercalated. In particular, a silicon oxide-based anode active material may result in more severe volume expansion.

Such a volume expansion of the anode active material may weaken the adhesiveness of the polymer binder during cycles of electrochemical devices to impair a conductive structure, thereby deteriorating charging and discharging characteristics and life characteristics of the electrochemical devices.

DISCLOSURE

Technical Problem

Therefore, it is an object of the present disclosure to provide an anode active material-containing slurry which can relieve the volume expansion of an anode active material by the intercalation and disintercalation of lithium during cycles of electrochemical devices to improve the durability of an anode active material layer, thereby enhancing the life characteristics of the electrochemical devices, and can form an anode active material layer having a high peeling force even though a polymer binder having a relatively lower weight-average molecular weight is used; an anode using the slurry; and an electrochemical device comprising the anode.

Technical Solution

In order to achieve the object, in accordance with one aspect of the present disclosure, there is provided a slurry comprising an anode active material; a polymer binder comprising styrene butadiene rubber and potassium polyacrylate; a conductive material; and a dispersing medium.

In the present disclosure, the slurry may comprise 80 to 100 parts by weight of the anode active material, 5 to 10 parts by weight of the polymer binder, and 1 to 5 parts by weight of the conductive material, based on 100 parts by weight of the dispersing medium.

The potassium polyacrylate may be produced by the neutralization reaction of polyacrylic acid and potassium hydroxide (KOH).

The polyacrylic acid may have a weight-average molecular weight of 400,000 to 800,000.

An aqueous solution containing the potassium polyacrylate produced by the neutralization reaction exhibits a concentration of hydrogen ions corresponding to pH 7 to pH 9. The anode active material-containing slurry may have a viscosity of 7 to 56 Pa·s at 23° C. and a shear rate of 0.1 to 1 $s^{-1}$.

The anode active material-containing slurry may further comprise a water-based binder.

The water-based binder may be any one selected from the group consisting of carboxymethyl cellulose, polytetrafluoroethylene, polyethylene, polypropylene, ethylene/propylene copolymers, polybutadiene, butyl rubbers, fluorine rubbers, polyethylene oxide, polyvinylpyrrolidone, polyepichlorohydrin, polyphosphazene, polyacrylonitrile, polystyrene, ethylene/propylene/diene copolymers, polyvinylpyridine, chlorosulfonated polyethylene, latex, polyester resins, acrylic resins, phenolic resins, epoxy resins, polyvinyl alcohol, hydroxypropyl cellulose, and a mixture thereof.

The anode active material may have an average diameter of 1 to 30 μm, preferably 5 to 20 μm.

Also, the anode active material may comprise metallic lithium, a carbon material, a metal compound, a metal oxide, or a mixture thereof. The metal compound may be any one selected from the group consisting of Si, Ge, Sn, Pb, P, Sb, Bi, Al, Ga, In, Ti, Mn, Fe, Co, Ni, Cu, Zn, Ag, Mg, Sr, Ba, and a mixture thereof.

The metal oxide may be any one selected from the group consisting of silicon oxide, tin oxide, titanium oxide, lithium/vanadium-based oxide, and a mixture thereof.

The dispersing medium may be any one selected from the group consisting of acetone, tetrahydrofuran, methylene chloride, chloroform, dimethylformamide, N-methyl-2-pyrrolidone (NMP), cyclohexane, water and a mixture thereof.

Also, in accordance with another aspect of the present disclosure, there is provided an anode, comprising a current collector; and an anode active material layer formed by coating the above-mentioned slurry on one or both surface(s) of the current collector, followed by drying.

The drying may comprise a first drying step conducted at a temperature of 120 to 140° C., and a second drying step conducted at a temperature of 80 to 100° C. under vacuum.

Further, in accordance with still another aspect of the present disclosure, there is provided an electrochemical device, comprising a cathode, an anode, a separator interposed between the cathode and the anode, and a non-aqueous electrolyte solution, wherein the anode is the above-mentioned anode.

The electrochemical device may be a lithium secondary battery.

Advantageous Effects

The anode active material-containing slurry according to one aspect of the present disclosure can relieve the volume expansion of an anode active material by the intercalation and disintercalation of lithium during cycles of electrochemical devices to improve the durability of an anode active material layer, thereby enhancing the life characteristics of the electrochemical devices.

Also, the anode active material-containing slurry can form an anode active material layer having a high peeling force even though potassium polyacrylate with a relatively lower weight-average molecular weight is used.

Furthermore, the anode active material-containing slurry of the present disclosure exhibits high solid contents, thereby allowing economic drying of the used dispersing medium in the formation of the anode active material layer.

DESCRIPTION OF THE DRAWINGS

The accompanying drawings illustrate preferred embodiments of the present disclosure and, together with the foregoing disclosure, serve to provide further understanding of the technical spirit of the present invention. However, the present invention is not to be construed as being limited to the drawings.

BEST MODE

Figure 1:
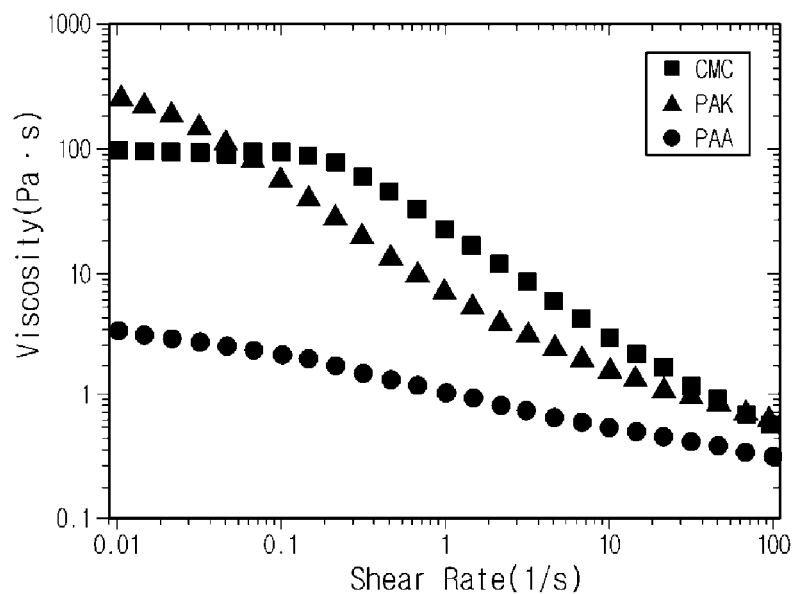
FIG. 1 is a graph showing the viscosity of aqueous solutions containing a binder on a shear rate.

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The slurry for forming an anode active material layer according to the present disclosure comprises an anode active material; a polymer binder comprising styrene butadiene rubber and potassium polyacrylate; a conductive material; and a dispersing medium. The dispersing medium can disperse the anode active material, and can dissolve the potassium polyacrylate.

An anode active material which is used in the anode of an electrochemical device may undergo volume expansion in the procedure that lithium is intercalated or disintercalated. In particular, a silicon oxide-based anode active material may result in more severe volume expansion.

Such a volume expansion of the anode active material may generate cracks in an anode active material layer to cause the release of an anode active material as cycles of electrochemical devices progress. From this, the charging and discharging characteristics and life characteristics of the electrochemical devices may be deteriorated.

In order to solve this problem, the polymer binder comprising potassium polyacrylate is used in the slurry of the present disclosure.

The slurry of the present disclosure may comprise 80 to 100 parts by weight of the anode active material, 5 to 10 parts by weight of the polymer binder, and 1 to 5 parts by weight of the conductive material, based on 100 parts by weight of the dispersing medium.

In the present disclosure, the potassium polyacrylate may be produced by the neutralization reaction of polyacrylic acid and potassium hydroxide (KOH).

The polyacrylic acid may have a weight-average molecular weight of 400,000 to 800,000.

For example, an aqueous solution of polyacrylic acid with a concentration of hydrogen ions corresponding to about pH 2.2 can be titrated with an 1M aqueous solution of potassium hydroxide to produce an aqueous solution of potassium polyacrylate that exhibits pH 7 to 9, preferably pH 7.9 to 8. To this aqueous solution, an anode active material and a conductive material are added to obtain a slurry for forming an anode active material layer.

Thus, when the slurry for forming an anode active material layer is obtained by titration of an aqueous solution of polyacrylic acid with an aqueous solution of potassium hydroxide, the potassium polyacrylate is produced by the neutralization reaction of the polyacrylic acid and the potassium hydroxide to increase the viscosity of the slurry for forming an anode active material layer. The slurry for forming an anode active material layer may have a viscosity of 7 to 56 Pa·s at 23° C. and a shear rate of 0.1 to 1 $s^{-1}$.

FIG. 1 is a graph showing the viscosity of aqueous solutions on a shear rate, the aqueous solutions containing carboxymethyl cellulose (CMC) being conventionally used, polyacrylic acid (PAA) and potassium polyacrylate (PAK) used in the present disclosure as a binder, respectively.

The aqueous solution of potassium polyacrylate (PAK) is shown to exhibit a higher viscosity in all shear rate regions, as compared with the aqueous solution of polyacrylic acid (PAA).

Although such a potassium polyacrylate has a weight-average molecular weight substantially lower than that of a general polymer binder such as carboxymethyl cellulose with a weight-average molecular weight of 900,000 or higher, it is used in an anode active material-containing slurry and the slurry is coated on an anode to form an anode active material layer having a high peeling force.

Particularly, when an anode active material undergoing severe volume expansion during the intercalation and disintercalation of lithium ions is used together with a polymer binder with a low weight-average molecular weight of 500,000 or less to form an anode active material layer, the anode active material layer itself has low adhesiveness, and the volume expansion of the anode active material caused during charging and discharging processes may weaken the adhesiveness of the polymer binder to impair a conductive structure.

However, according to the present disclosure, an aqueous solution of polyacrylic acid with a weight-average molecular weight of 400,000 to 800,000 is titrated with potassium hydroxide to form potassium polyacrylate, and a polymer binder comprising the potassium polyacrylate can be used together with a nano-sized anode active material having a relatively small size, as well as a relatively large anode active material having an average diameter of 1 to 30 μm, preferably 5 to 20 μm, to form an anode active material layer having a high peeling force.

The anode active material-containing slurry may further comprise a water-based binder.

The water-based binder may be any one selected from the group consisting of carboxymethyl cellulose, polytetrafluoroethylene, polyethylene, polypropylene, ethylene/propylene copolymers, polybutadiene, butyl rubbers, fluorine rubbers, polyethylene oxide, polyvinylpyrrolidone, polyepichlorohydrin, polyphosphazene, polyacrylonitrile, polystyrene, ethylene/propylene/diene copolymers, polyvinylpyridine, chlorosulfonated polyethylene, latex, polyester resins, acrylic resins, phenolic resins, epoxy resins, polyvinyl alcohol, hydroxypropyl cellulose, and a mixture thereof.

Non-limiting examples of the anode active material may include any one which have been conventionally used in the anode of electrochemical devices, for example may include metallic lithium, a carbon material, a metal compound, a metal oxide, and a mixture thereof.

The carbon material may be materials capable of intercalating lithium, including carbon, petroleum coke, activated carbon, graphite and other carbon materials. The metal compound may be any one selected from the group consisting of Si, Ge, Sn, Pb, P, Sb, Bi, Al, Ga, In, Ti, Mn, Fe, Co, Ni, Cu, Zn, Ag, Mg, Sr, Ba, and a mixture thereof.

The metal oxide may be any one selected from the group consisting of silicon oxide, tin oxide, titanium oxide, lithium/vanadium-based oxide, and a mixture thereof. The dispersing medium may be any one selected from the group consisting of acetone, tetrahydrofuran, methylene chloride, chloroform, dimethylform amide, N-methyl-2-pyrrolidone (NMP), cyclohexane, water and a mixture thereof, but is not limited thereto.

The dispersing medium may be removed in the preparation of an electrochemical device since it may be remained in the finally prepared electrochemical device to cause various side reactions depending on the kinds thereof.

Also, in accordance with another aspect of the present disclosure, there is provided an anode, comprising a current collector; and an anode active material layer formed by coating the above-mentioned slurry on one or both surface(s) of the current collector, followed by drying.

Non-limiting examples of the current collector may include foils obtained from copper, gold, nickel, a copper-containing alloy, or a combination thereof. The drying may comprise a first drying step conducted at a temperature of 120 to 140° C., and a second drying step conducted at a temperature of 80 to 100° C. under vacuum. The first drying step may be conducted for a relative short time of 2 to 4 minutes.

Meanwhile, the anode active material slurry containing potassium polyacrylate according to the present disclosure has about 42% of solid contents, whereas a general anode active material slurry containing carboxylmethyl cellulose has about 30% of solid contents. In the anode active material slurry, a high solid content means that a low amount of the dispersing medium is present in the slurry. Therefore, under the same drying conditions, the anode active material slurry containing potassium polyacrylate can be economically dried for a shorter time.

Further, in accordance with still another aspect of the present disclosure, there is provided an electrochemical device, comprising a cathode, an anode, a separator interposed between the cathode and the anode, and a non-aqueous electrolyte solution, wherein the anode is the above-mentioned anode.

The electrochemical device may be any device in which electrochemical reactions may occur, and specific examples of the electrochemical devices include all kinds of primary batteries, secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

The electrochemical device of the present disclosure may be prepared by lamination (stacking), folding or stacking/folding of a separator and an electrode, as well as a conventional winding process.

Also, the electrochemical device of the present disclosure is not limited to its shape. For example, the shape of the electrochemical device may be cylindrical such as a can, prismatic, pouch, or coin.

Meanwhile, a cathode applied in the electrochemical device of the present disclosure is not particularly limited, and may be manufactured by binding a cathode active material to a current collector according to a conventional method known in the art.

As a cathode active material, those that are commonly used in cathodes of conventional electrochemical devices may be used. Non-limiting examples of the cathode active material may include a lithium-manganese oxide, a lithium-cobalt oxide, a lithium-nickel oxide, a lithium-iron oxide, and a combination thereof, i.e., a lithium-containing composite oxide. Also, non-limiting examples of the current collector for a cathode may include foils obtained from aluminum, nickel, or a combination thereof.

Also, a separator which may be used in the present disclosure includes any one which has been conventionally used in the art, for example, porous membranes or non-woven fabrics made of a polyolefin-based polymer, but is not limited thereto.

The polyolefin-based porous membranes may be obtained from a polymer selected from polyethylenes such as a high-density polyethylene, a linear low-density polyethylene, a low-density polyethylene and an ultra-high molecular weight polyethylene, polypropylene, polybutylene, polypentene, and a mixture thereof.

The non-woven fabric may be a polyolefin-based non-woven fabric, or a non-woven fabric made of a polymer selected from polyethylene terephthalate, polybutylene terephthalate, polyester, polyacetal, polyamide, polycarbonate, polyimide, polyether ether ketone, polyether sulfone, polyphenylene oxide, polyphenylene sulfide, polyethylene naphthalate and a mixture thereof. The non-woven fabric may be a spun-bond or melt-blown fabric consisting of a long fiber in structure.

The porous substrate has preferably a thickness of 5 to 50 μm, but is not particularly limited thereto. Also, the porous substrate has a pore size of 0.01 to 50 μm and a porosity of 10 to 95%, but is not particularly limited thereto.

Also, in order to improve the mechanical strength of the separator and the safety of the electrochemical device, a porous coating layer comprising inorganic particles and a polymer binder may further be formed on at least one surface of the porous substrate.

The inorganic particles are not particularly limited if they are electrochemically stable. That is, the inorganic particles which may be used in the present disclosure are not particularly limited unless an oxidation-reduction reaction occurs in an operating voltage range (for example, 0 to 5 V based on $Li/Li^+$) of an applied electrochemical device. Particularly, inorganic particles having a high dielectric constant can increase the dissociation rate of an electrolyte salt, such as a lithium salt, in a liquid electrolyte, thereby improving an ionic conductivity the electrolyte solution.

The polymer binder may be at least one selected from the group consisting of polyvinylidene fluoride-co-hexafluoropropylene (PVDF-HFP), polyvinylidene fluoride-co-chlorotrifluoroethylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, and a mixture thereof, but is not limited thereto.

In the porous coating layer, the polymer binder is coated on a part or the whole of the surface of the inorganic particles, and the inorganic particles are connected with or immobilized to each other by the polymer binder, from which interstitial volumes are preferably formed between the inorganic particles. That is, the inorganic particles are substantially present in contact with each other, and the interstitial volumes between the inorganic particles become the pores of the porous coating layer. It is preferable that the interstitial volumes present between the inorganic particles have a size equivalent to or less than an average diameter of the inorganic particles.

Meanwhile, the electrolyte solution used in the present disclosure comprises a lithium salt as an electrolyte salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte solution used in the present disclosure comprises an organic solvent which is conventionally used in an electrolyte solution for a lithium secondary battery, for example, ethers, esters, amides, linear carbonates, cyclic carbonates, and a mixture thereof.

Among these, a linear carbonate, a cyclic carbonate, or a mixture thereof are representatively used. The cyclic carbonate may be selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, a halide thereof and a mixture thereof. Examples of the halide include fluoroethylene carbonate (FEC) and the like, but are not limited thereto. The linear carbonate may be selected from the group consisting of dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto.

In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

Also, the ether which may be used as the organic solvent is any one selected from the group consisting of dimethyl ether, diethyl ether, dipropyl ether, methyl ethyl ether, methyl propyl ether, ethyl propyl ether and a mixture thereof, but is not limited thereto.

In addition, the ester which may be used as the organic solvent is any one selected from the group consisting of methyl acetate, ethyl acetate, propyl acetate, methyl propionate, ethyl propionate, γ-butyrolactone, γ-valerolactone, γ-caprolactone, σ-valerolactone, ε-caprolactone and a mixture thereof, but is not limited thereto.

The introduction of the non-aqueous electrolyte may be carried out in any suitable step during the manufacturing of the electrochemical device depending on the manufacturing processes and desired physical properties of a final product. Specifically, the electrolyte may be introduced before assembling a battery or in the final step of the assembling. Hereinafter, the present disclosure will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

1. Example (1) Preparation of Anode

An aqueous solution (pH 2.21) containing polyacrylic acid (Sigma Aldrich) having a weight-average molecular weight of 450,000 was titrated with a 1M aqueous solution (pH 7.94) of potassium hydroxide to obtain an aqueous solution (pH 7.94) containing potassium polyacrylate.

To the aqueous solution of potassium polyacrylate, a mixture of KSC 1064 (SiO:C, Shin-Etsu Chemical Co., Ltd.) and MAG-V2 (a mixture of artificial graphite/natural graphite, Hitachi chemical Co., Ltd.) in a weight ratio of 1:2 as an anode active material, styrene-butadiene rubber as a water-based binder, and a carbon nanotube as a conductive material were added and mixed with each other to obtain a slurry (pH 7.37) containing the anode active material, the polymer binder and the conductive material in a weight ratio of 90:7:3, and the polymer binder comprising the styrene-butadiene rubber and the potassium polyacrylate in a weight ratio of 7:3.

That is, the potassium polyacrylate obtained from the titration and the styrene-butadiene rubber acted as a polymer binder, and water acted as a dispersing medium of the slurry. Then, the anode active material-containing slurry was coated on a Cu-foil current collector by a conventional method, to prepare an anode.

(2) Preparation of Cathode $LiNi_{85}Co_{10}Al_5O_2$ as a cathode material, a conductive material and a polymer binder were mixed in a weight ratio of 89:5:6 to obtain a slurry, and the slurry was coated on an Al-foil current collector by a conventional method, followed by drying, to prepare a cathode.

(3) Preparation of Electrochemical Device

A porous polyethylene membrane was interposed between the cathode and the anode prepared above to obtain an electrode assembly, and the electrode assembly was put in a pouch-type case to prepare a full cell.

2. Comparative Example

The procedures of the Example were repeated except that an aqueous solution (pH 6.78) of carboxymethyl cellulose was used instead of the aqueous solution of potassium polyacrylate to obtain an anode active material-containing aqueous solution (pH 5.48), and the slurry was used in the preparation of an anode.

A porous polyethylene membrane was interposed between the anode prepared above and the same cathode as that of the Example to obtain an electrode assembly, and the electrode assembly was put in a pouch-type case to prepare a full cell.

3. Evaluation of Electrochemical Device for Cycle Characteristic

The pouch-type full cells prepared above were measured for their capacity under continuous charging and discharging conditions.

Figure 2:
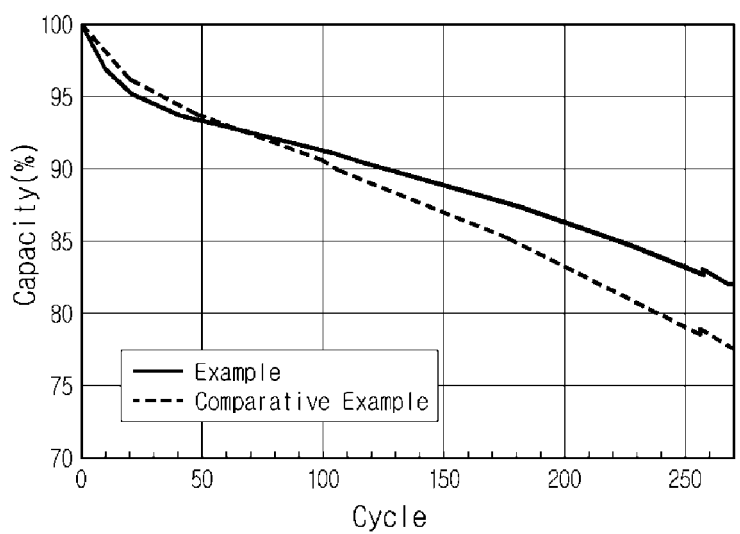
FIG. 2 is a graph showing the capacity retention (%) of electrochemical devices prepared in the Example and the Comparative Example of the present disclosure during the electrochemical devices progress 270 cycles.

FIG. 2 shows the capacity retention (%) to cycles of the pouch-type full cells prepared in the Example and the Comparative Example. From FIG. 2, it was confirmed that the capacity retention of the cell prepared in the Example was 82.1% after 270 cycles while that of the Comparative Example being 77.7%. Thus, the cell of the Example exhibited an improvement of about 4.4% in its cycle characteristic, as compared with that of the Comparative Example.

4. Evaluation of Anode for Peeling Force

The anodes prepared in the Example and the Comparative Example were measured for their peeling force, and the results thereof are shown in Table 1.

TABLE 1

|  | Peeling Force (gF) | | Average |
| --- | --- | --- | --- |
|  | 1st Measurement | 2nd Measurement | Peeling Force (gF) |
| Example | 141.0 | 142.0 | 141.5 |
| Comparative Example | 98.0 | 104.0 | 101.0 |

The average peeling force of the anode prepared in the Example was 141.5 gF, which exhibited an improvement of about 40% in the peeling force, as compared with that of the Comparative Example.

The foregoing disclosure is given by way of illustration only, and various changes and modifications within the spirit and scope of the disclosure will become apparent to those skilled in the art from this detailed description. Accordingly, it should be understood that the Examples of the present disclosure are provided for the purpose of illustrations only and to better explain to a person having ordinary skill in the art, and is not intended to limit the scope of the present disclosure. The scope of the present to be protected should be defined by the claims, all technical spirits equivalent thereto should be interpreted to be fallen within the scope of the present disclosure.

What is claimed is:

1. An anode active material-containing slurry for a lithium secondary battery, comprising:
    an anode active material for a lithium secondary battery, wherein the anode active material intercalates and deintercalates lithium;
    a polymer binder consisting of styrene butadiene rubber and potassium polyacrylate;
    a conductive material; and
    a dispersing medium,
    wherein the potassium polyacrylate is produced by a neutralization reaction of polyacrylic acid and potassium hydroxide (KOH), the polyacrylic acid has a weight-average molecular weight of 400,000 to 800,000, and the slurry has a viscosity of 7 to 56 Pa·s at 23° C. and a shear rate of 0.1 to 1 $s^{-1}$.

2. The slurry of claim 1, wherein based on 100 parts by weight of the dispersing medium,
    the anode active material is present in an amount of 80 to 100 parts by weight,
    the polymer binder is present in an amount of 5 to 10 parts by weight, and
    the conductive material is present in an amount of 1 to 5 parts by weight.

3. The slurry of claim 1, wherein the potassium polyacrylate produced by the neutralization reaction is in an aqueous solution which exhibits a concentration of hydrogen ions corresponding to pH 7 to pH 9.

4. The slurry of claim 1, further comprising a water-based binder.

5. The slurry of claim 4, wherein the water-based binder is any one selected from the group consisting of carboxymethyl cellulose, polytetrafluoroethylene, polyethylene, polypropylene, ethylene/propylene copolymers, polybutadiene, butyl rubbers, fluorine rubbers, polyethylene oxide, polyvinylpyrrolidone, polyepichlorohydrin, polyphosphazene, polyacrylonitrile, polystyrene, ethylene/propylene/diene copolymers, polyvinylpyridine, chlorosulfonated polyethylene, latex, polyester resins, acrylic resins, phenolic resins, epoxy resins, polyvinyl alcohol, hydroxypropyl cellulose, and a mixture thereof.

6. The slurry of claim 1, wherein the anode active material has an average diameter of 1 to 30 μm.

7. The slurry of claim 1, wherein the anode active material comprises metallic lithium, a carbon material, a metal compound, a metal oxide, or a mixture thereof.

8. The slurry of claim 7, wherein the metal compound is any one selected from the group consisting of Si, Ge, Sn, Pb, P, Sb, Bi, Al, Ga, In, Ti, Mn, Fe, Co, Ni, Cu, Zn, Ag, Mg, Sr, Ba, and a mixture thereof.

9. The slurry of claim 7, wherein the metal oxide is any one selected from the group consisting of silicon oxide, tin oxide, titanium oxide, lithium/vanadium-based oxide, and a mixture thereof.

10. The slurry of claim 1, wherein the dispersing medium is any one selected from the group consisting of acetone, tetrahydrofuran, methylene chloride, chloroform, dimethylform amide, N-methyl-2-pyrrolidone (NMP), cyclohexane, water and a mixture thereof.

11. An anode for a lithium secondary battery, comprising:
a current collector; and
an anode active material layer formed by coating the anode active material-containing slurry of claim 1 on one or both surface(s) of the current collector, followed by drying.

12. The anode of claim 11, wherein the drying comprises a first drying step conducted at a temperature of 120 to 140° C., and a second drying step conducted at a temperature of 80 to 100° C. under vacuum.

13. A lithium secondary battery, comprising a cathode, an anode, a separator interposed between the cathode and the anode, and a non-aqueous electrolyte solution, wherein the anode is defined in claim 11.

14. The slurry of claim 7, wherein the metal oxide is silicon oxide.

* * * * *